United States Patent
Prairie et al.

(10) Patent No.: US 7,065,268 B2
(45) Date of Patent: Jun. 20, 2006

(54) LINK DISCOVERY AND VERIFICATION PROCEDURE USING LOOPBACK

(75) Inventors: Danny Prairie, Kanata (CA); Daniel C. Tappan, Boxborough, MA (US); Richard Bradford, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/975,279

(22) Filed: Oct. 27, 2004

(65) Prior Publication Data

US 2005/0083835 A1    Apr. 21, 2005

Related U.S. Application Data

(63) Continuation of application No. 09/969,937, filed on Oct. 2, 2001, now Pat. No. 6,834,139.

(51) Int. Cl.
*G02B 6/26* (2006.01)
*G02B 6/42* (2006.01)

(52) U.S. Cl. .............. 385/17; 385/24; 398/3; 398/4; 370/222; 370/223; 370/224; 370/249

(58) Field of Classification Search .......... 370/216, 370/222–225, 248, 249; 385/17, 24; 398/3, 398/4
See application file for complete search history.

(56) References Cited

U.S. PATENT DOCUMENTS

| | | | |
|---|---|---|---|
| 4,538,026 A | 8/1985 | Yasue |
| 5,159,595 A | 10/1992 | Flanagan et al. |
| 5,285,305 A | 2/1994 | Cohen et al. |
| 5,291,490 A | 3/1994 | Conti et al. |
| 5,315,674 A | 5/1994 | Asako |
| 5,396,357 A | 3/1995 | Goossen et al. |
| 5,442,623 A | 8/1995 | Wu |
| 5,469,428 A | 11/1995 | Tokura et al. |
| 5,557,437 A | 9/1996 | Sakai et al. |
| 5,659,540 A | 8/1997 | Chen et al. |
| 5,710,760 A | 1/1998 | Moll |
| 5,737,320 A | 4/1998 | Madonna |
| 6,023,455 A | 2/2000 | Takahashi |
| 6,154,448 A | 11/2000 | Petersen et al. |
| 6,184,778 B1 | 2/2001 | Tsuji |
| 6,226,111 B1 | 5/2001 | Chang et al. |
| 6,639,893 B1 | 10/2003 | Chikenji et al. |
| 6,657,971 B1 | 12/2003 | Costa |
| 6,718,141 B1 | 4/2004 | deVette |
| 2001/0019553 A1 | 9/2001 | Orsatti |
| 2001/0038648 A1 | 11/2001 | Sutton et al. |
| 2002/0003639 A1 | 1/2002 | Arecco et al. |
| 2002/0159393 A1 | 10/2002 | Smith et al. |
| 2003/0058497 A1 | 3/2003 | Park et al. |

OTHER PUBLICATIONS

Lang, et al., Link Management Protocol (LMP), Internet Draft, Internet Engineering Task Force, Jul. 2001.

*Primary Examiner*—Akm Enayet Ullah
*Assistant Examiner*—Daniel Petkovsek
(74) *Attorney, Agent, or Firm*—Cindy Kaplan

(57) ABSTRACT

Systems and methods for link discovery and verification technique that minimize the need for line termination resources that generate and interpret packets. Of two nodes verifying a link to one another, only one node need have any line termination capability. The node lacking line termination capability simply loops back packets generated by the other node thus verifying the link. Thus, an optical cross-connect can verify links to a wide variety of node types by employing a single line termination unit capable of terminating any suitable packet type. Alternatively, a router can verify connectivity to an optical cross-connect even when the optical cross-connect lacks any line termination capability at all. This saves greatly on implementation costs for optical networks.

18 Claims, 5 Drawing Sheets

LINK DISCOVERY AND VERIFICATION PROCEDURE USING LOOPBACK

This application is a continuation of U.S. application Ser. No. 09/969,937, filed Oct. 2, 2001, U.S. Pat. No. 6,834,139, which is hereby incorporated by reference for all purposes.

BACKGROUND OF THE INVENTION

The present invention relates to data communication networks, and more particularly to systems and methods for discovering and verifying links between nodes.

Internet or other data traffic is typically forwarded from a source to a destination through a series of nodes connected by links. The nodes represent network devices such as routers, switches, etc. Similarly, constant bit-rate traffic sends streams of bits across networks of switches. For simplicity this application often refers to packet networks, but the invention applies equally well to cell or bit oriented networks of devices. For example, an exchange of packets is comparable to an exchange of cells or an exchange of bit patterns.

The links between network devices are physical media such as optical fiber, twisted pair, etc. and often connect a pair of nodes. Various protocols that control the forwarding of packets through a network depend on each node having a correct understanding of the links available to its immediate neighbors.

Typically, discovery and/or verification of a link between two nodes are accomplished by an exchange of packets over the link. As will now be explained, however, this exchange of packets is problematic for an important new class of network devices.

To accommodate increasing volumes of network traffic, the Internet is relying more and more on the vast bandwidth of optical fiber media. Routing and switching operations, however, have largely remained in the electrical domain. The need to convert optical signals to electrical form and then perform switching and/or routing computations on the electrical signals has become a bottleneck for optical networks. In order to remove this bottleneck, all-optical cross-connects (OXCs) have emerged as an important building block for optical networks. In an OXC, optical inputs and outputs are coupled to one another through a switching matrix without intermediate conversion to an electrical signal. Since the optical signals pass through untouched, OXCs do not incorporate expensive hardware either for conversion to electrical form and reconversion to optical form, or for processing packets in accordance with a protocol. This results in enormous savings in cost and extremely high throughput. Another advantage of the OXC is that it requires no special adaptation to the protocol or data rate of the data carried by the switched optical signals.

To best integrate OXCs into the Internet, it is desirable to discover and verify links to and from them. However, if an OXC is to exchange packets with its neighbors for the purpose of link discovery and verification according to conventional techniques, it will have to incorporate line termination capability, i.e., the ability to generate and interpret packets in accordance with a protocol used by a neighbor. Supporting this capability will require that a line termination unit (LTU) capable of generating and interpreting packets according to the relevant protocol be incorporated within the OXC. To preserve the protocol transparency of OXC operation, it will be desirable to incorporate a separate line termination unit (LTU) for each anticipated protocol that might be terminated by a neighboring node. Each LTU would incorporate the electrical to optical and the optical to electrical conversion circuitry as well as high speed packet processing (or cell processing, data pattern processing, etc.) that would otherwise be made unnecessary by use of the OXC.

Furthermore, when a particular OXC switch port is having its neighbor connectivity verified, that port must be switched to another port connected to the correct LTU so that the proper packets may be exchanged. Thus, the needed LTU consumes a port and also a significant percentage of the available switching resources. It becomes clear then that current link discovery and verification techniques are expensive to apply to optical switching equipment that is not otherwise capable of originating and/or interpreting packets via optical links.

What is needed are systems and methods for link discovery and verification that minimize the needed line termination resources and are thus suitable for implementation on devices that do not otherwise provide extensive line termination capabilities such as OXCs.

SUMMARY OF THE INVENTION

One embodiment of the present invention provides systems and methods for link discovery and verification technique that minimize the need for line termination resources that generate and interpret packets. Of two nodes verifying a link to one another, only one node need have any line termination capability. The node lacking line termination capability simply loops back packets generated by the other node thus verifying the link. Thus, an optical cross-connect can verify links to a wide variety of node types by employing a single line termination unit capable of terminating any suitable packet type. Alternatively, a router can verify connectivity to an optical cross-connect even when the optical cross-connect lacks any line termination capability at all. This saves greatly on implementation costs for optical networks.

According to a first aspect to the present invention, a method for operating a first node in a data communication network to verify connectivity to a second node in the data communication network includes: looping back a port of the first node by connecting the input of the port to an output of the port and notifying the second node of a looped back condition of the port to facilitate connectivity verification.

According to a second aspect of the present invention, a method for operating a first node in a data communication network to verify connectivity to a second node in a data communication network includes: transmitting data from a port at the first node, monitoring data received at the port of the first node to check for a match to the transmitted data and if the received data matches the transmitted data, determining that the port of the first node is connected to a looped back port of the second node storing an indication of connectivity between the first node and the second node.

According to a third aspect of the present invention, apparatus for operating a first node in a data communication network to verify connectivity to a second node in the data communication network includes: a port having an input and an output, and a control processor that connects the port input and the port output and that notifies the second node of a looped back condition of the port to facilitate connectivity verification.

According to a fourth aspect of the present invention, apparatus for operating a first node in a data communication network to verify connectivity to a second node in the data communication network includes: a port having an input and an output, a line termination unit capable of, in accordance with a protocol, interpreting data received via the port input and formatting data to be transmitted via the port output, and a control processor that connects the line termination unit to the port, monitors data received at the port at the first node to check for a match to data transmitted at the first port, and if the received data matches the transmitted data, determines that the port of the first node is connected to a looped-back port at the second node and stores an indication of connectivity between the first node and the second node.

Further understanding of the nature and advantages of the inventions herein may be realized by reference to the remaining portions of the specification and the attached drawings.

DESCRIPTION OF SPECIFIC EMBODIMENTS

The present invention finds application in networks where it is desirable for nodes to discover and verify links among themselves. Wherever the terms "verify" or "verification" are used, it will be understood that the present invention also applies to the discovery of links. One particular application of the present invention is to optical cross-connects and nodes adjacent to optical cross-connects that require link verification.

Figure 1:
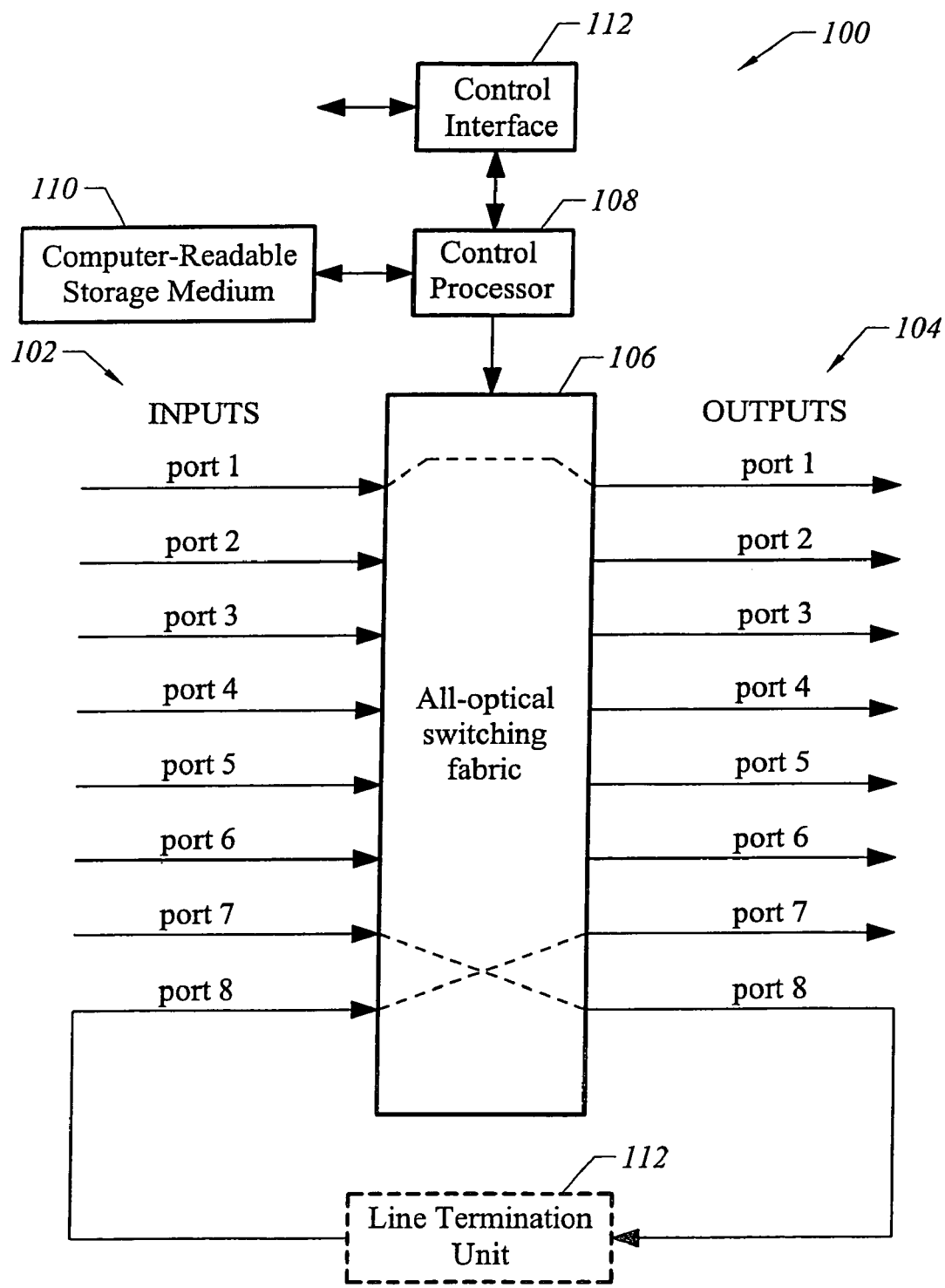
FIG. 1 depicts an optical cross-connect suitable for implementing one embodiment of the present invention.

Before describing details of link verification, the structures of representative participating nodes will be described. FIG. 1 depicts an all-optical cross-connect (OXC) suitable for implementing one embodiment of the present invention. An optical cross-connect 100 provides connectivity between a plurality of inputs 102 and a plurality of outputs 104. Any one of inputs 102 may be selectively coupled to any one of outputs 104 through an all-optical switching fabric 106. Switching fabric 106 has eight ports numbered 1 through 8, each consisting of one of inputs 102 and one of outputs 104.

Switching fabric 106 is implemented by, e.g., a MEMS integrated circuit that uses adjustable mirrors to guide light from the desired input to the desired output. A representative switching fabric is the PDS-002 model available from OMM, Inc. of San Diego, Calif. Any suitable technology may be used to implement switching fabric 106.

A control processor 108 selects a mapping of inputs to outputs. Processor 108 may be implemented in any suitable manner such as, e.g., a general programmable processor, custom logic, multiprocessor system, or any combination thereof. Processor 108 may execute software instructions in any suitable machine level or high level programming language. A storage medium 110 may store instructions for control processor 108. Storage medium 110 may represent a memory device such as a random access memory device, a magnetic storage medium, an optical storage medium, etc. Instructions on storage medium 110 may be loaded from another storage medium such as e.g., a compact disc, (CD), a digital video disc (DVD), a floppy disc, etc.

Control packets used in implementing one embodiment of the present invention may be transmitted and received via a control interface 112. Control interface 112 may be e.g., an Ethernet interface, a SONET interface, etc. Control interface 112 may also receive control packets to direct the mapping between inputs 102 and outputs 104.

In switching fabric 106 of FIG. 1, port 1 is depicted to be in a looped-back condition where the input is mapped to the output to support link verification. As will be described, a neighboring node may verify a link to port 1 by reflecting packets through the input and output of port 1. A line termination unit (LTU) 112 is depicted as being connected to port 8. LTU 112 is capable of converting between electrical and optical signals and is also capable of generating and interpreting packets (or cells or other relevant data unit, etc.) in accordance with a particular protocol such as packet over SONET (POS). As will be explained below, LTU 112 may send and receive packets to verify a link with a neighboring node that does not incorporate a line termination capability or which contains in incompatible line termination capability. The neighboring node will loop back the packets generated by LTU 112. In FIG. 1, port 7 is depicted as being coupled by switching fabric 106 to port 8 so that LTU 112 may support link verification between port 7 and a node to which port 7 is connected.

Figure 2:
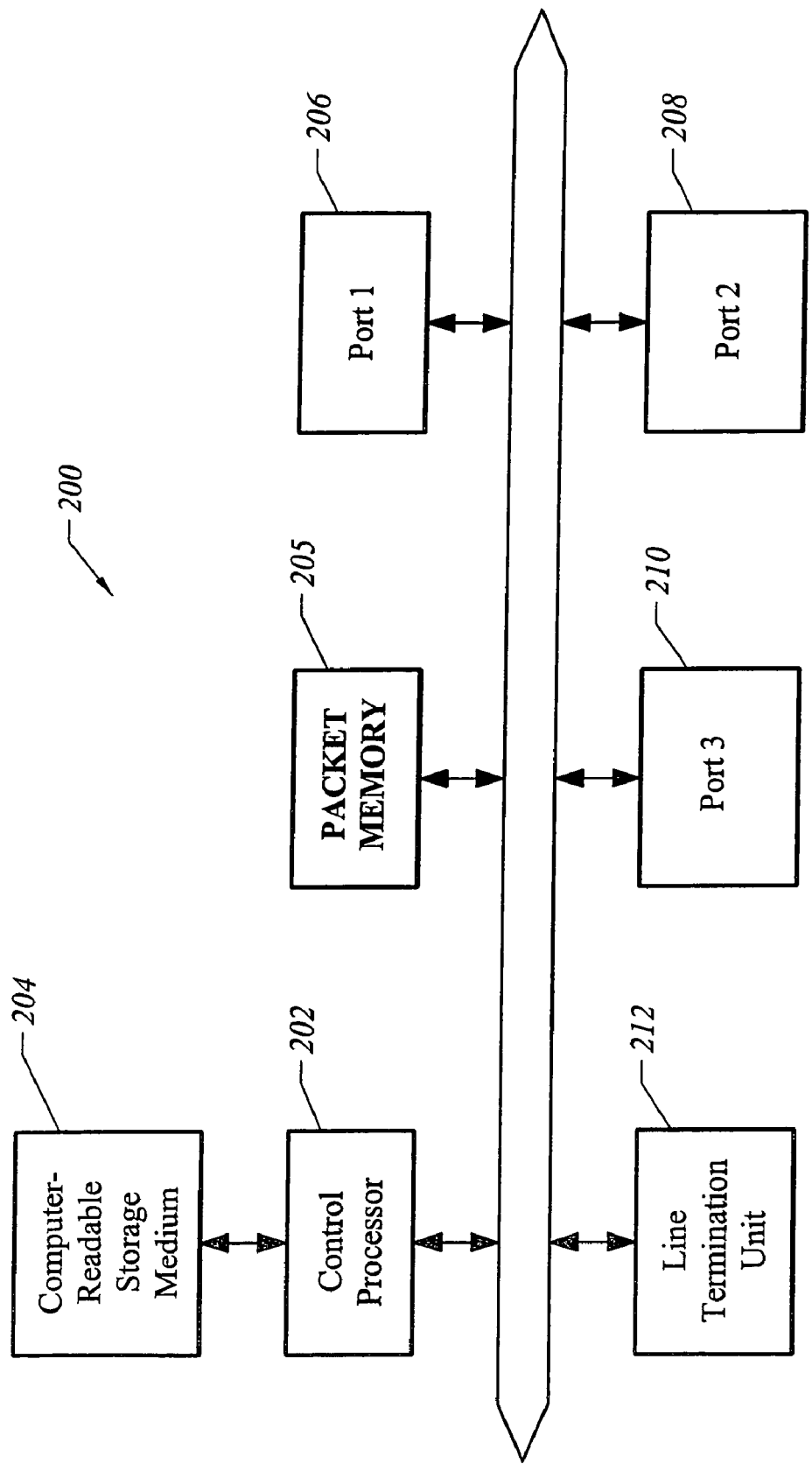
FIG. 2 depicts a router suitable for implementing one embodiment of the present invention.

Referring now to FIG. 2, a router 200 suitable for implementing the present invention is depicted. Router 200 includes a control processor 202 that is coupled to a computer-readable storage medium 204. When acting under the control of appropriate software or firmware, control processor 202 is responsible for such router tasks as routing table computations, network management, and general processing of packets. Control processor 202 may also implement link discovery and verification processes according to one embodiment of the present invention. Router 200 includes a packet memory 205 for intermediate storage of packets being forwarded by router 200. Other elements of router 200 may incorporate similar processing hardware and/or software as well as memory for storing instructions and intermediate storage of data including packets.

Router 200 incorporates multiple ports 206, 208, and 210 for sending and receiving packets. The ports may be interfaces to various types of physical medium such as optical media, twisted pair media, etc. A line termination unit (LTU) 212 is capable of generating and interpreting packets in accordance with a particular protocol. If necessary to accommodate multiple packet types, there may be multiple line termination units even though only one is depicted. Also, appropriate line termination capability may be included within one or more of the ports. LTU 212 may also generate and interpret control packets to implement link verification according to the present invention. The generation and interpretation of control packets may occur under the direction of control processor 202. The control packets may be transmitted and received via any appropriate port.

Figure 3:
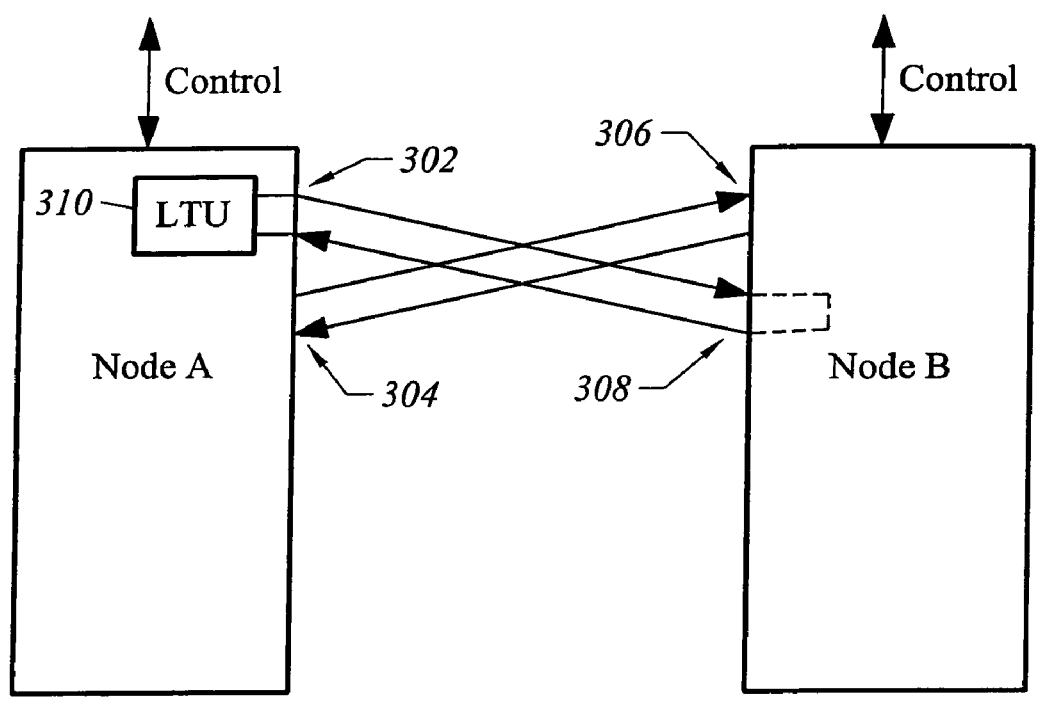
FIG. 3 depicts two nodes whose connectivity may be verified according to one embodiment of the present invention.

Now that the structures of representative participating nodes have been described, link verification according to one embodiment of the present invention will be described with reference to FIG. 3. Node A includes a port 302 and a port 304 while node B includes a port 306 and a port 308. In the configuration shown in FIG. 3, port 302 of node A is connected to port 308 of node B and port 304 of node A is connected to port 306 of node B. Both depicted connections are bi-directional. Any type of network device including devices such as optical cross-connect 100 or router 200 may implement node A and node B. Verification of the link between port 302 of node A and port 308 of node B will now be described. Node A has an LTU 310 that is capable of connecting to port 302 so that it is able to transmit and receive packets via port 302. LTU 310 may transmit and receive packets (of cells, unframed data, etc.) in accordance with any protocol and at any data rate for the purpose of link verification. It is not required that node B include any comparable line termination capability or any line termination capability at all. Node A and node B are capable of exchanging control packets via a control channel (not shown).

Figure 4:
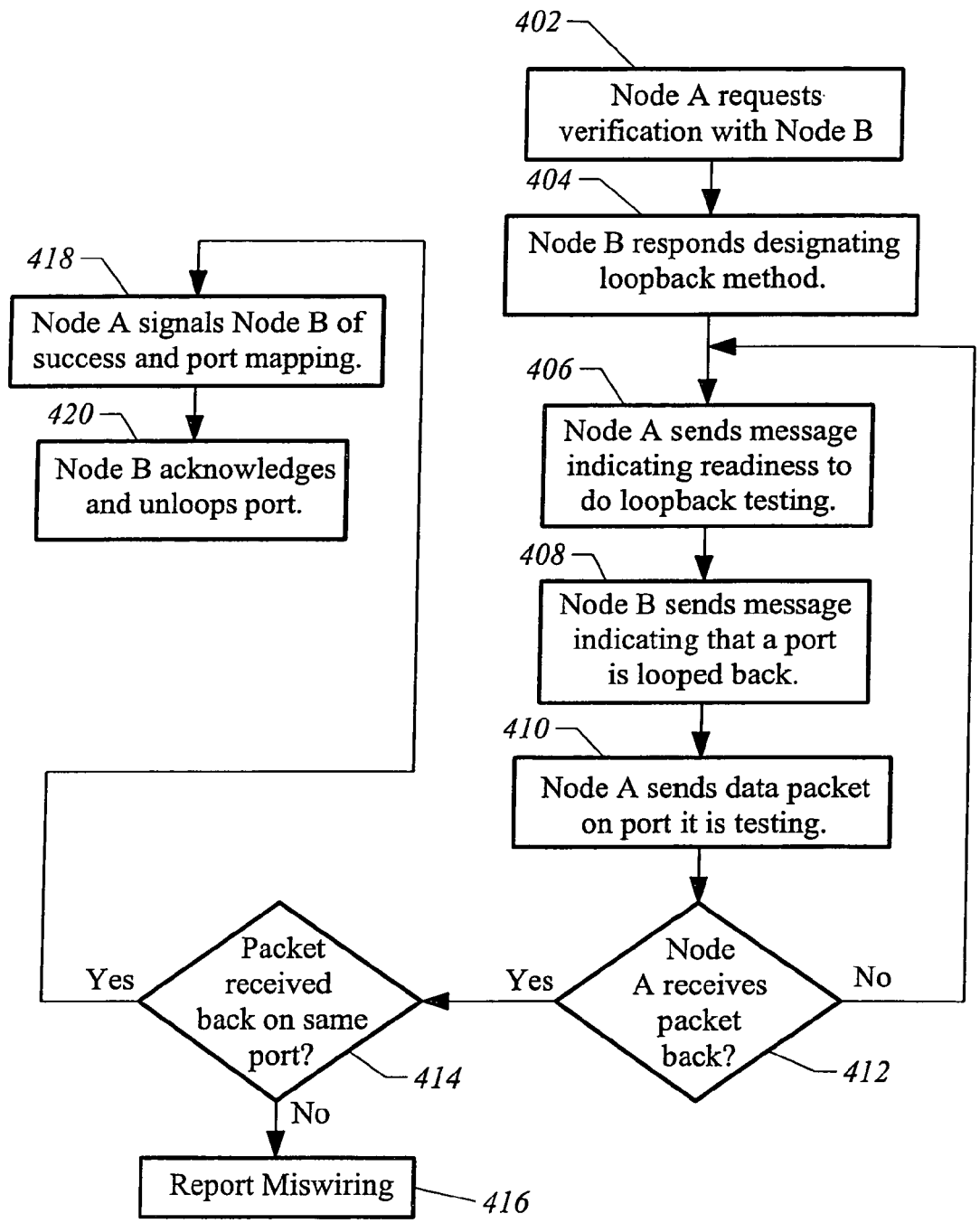
FIG. 4 is a flowchart describing steps of verifying a link according to one embodiment of the present invention.

Details of link verification operation will be described in terms of an extension of the Link Management Protocol (LMP) which is described in Lang, et al., Link Management Protocol (LMP), Internet Draft, Internet Engineering Task Force, July 2001, the contents of which are herein incorporated in their entirety by reference for all purposes. FIG. 4 is a flowchart describing steps of verifying the connection between port 302 at node A and all of the ports at node B that are available for link verification according to one embodiment of the present invention. A systematic link verification between node A and node B may be performed by repeating the procedure of FIG. 4 for each port on node A available for link verification.

At step 402, node A requests loop verification with node B via the control channel. The verification request includes the IP addresses of node A and node B and an identifier specifying port 302. At step 404, node B responds with an LMP VerifyTransportMechanism message that designates "LoopBack" as the verification mechanism. Alternatively, a request to use the loopback mechanism can be specified in the request of node A.

Link verification now proceeds similarly to the way defined in the LMP Internet Draft cited above but modified according to the present invention. At step 406, node A sends a message not specified by LMP, TestsStatusLoopReady, indicating readiness to do loopback testing on port 302. Node B responds by looping back one of its ports which is not currently in use and then at step 408 sends an LMP TestStatusPending message to node A via the control channel. The TestStatusPending message identifies node A as the source of the test request and further identifies which port has been looped back. For example, either port 306 or port 308 may be looped back initially, if they are not in use for communicating payload data. In FIG. 3, port 308 is depicted as being looped back. Alternatively, if there are no more remaining ports on node B to loop back, the TestStatusPending message will be sent with a null identifier instead of one specifying a port. This indicates that there is no link between the currently tested port of node A and any port of node B. Node A would respond by halting the link verification.

At step 410, node A sends a test packet via port 302. The packet is generated and formatted in accordance with an appropriate protocol by LTU 310. In one embodiment, this packet specifies the IP address of node A and a port identifier of port 302. At step 412, node A tests for receipt of the same packet back. According to one embodiment of the present invention, node A is capable of detecting receipt of this packet on any of its ports that are not in use. This may require additional LTUs or that node A be configured to simultaneously couple LTU 310 to multiple ports. Depending on the protocol employed by LTU 310, node A may instead of sending a packet out, detect a looped back state of a port receiving the signal.

At step 414 tests whether the packet (or cell or unframed data, etc.) Has in fact been received back on the same port 302 used for transmission. If the packet was received on a different port, this indicates a miswiring that is reported to an operator at step 416. If node A is not capable of monitoring multiple ports simultaneously for the looped back packet, steps 414 and 416 may be omitted.

If the packet has been received back at port 302, then at step 418 node A sends node B a "TestStatusLoopBackSuccess" message over the control channel. In one embodiment, this message has a similar format to the LMP TestStatusSuccess message. The TestStatusLoopBackSuccess message identifies the ports connected by the link that has just been verified. At step 420, node B responds to node A with an LMP TestStatusSuccess message as an acknowledgment and removes the loopback connection from the port that it looped back. If node A at step 412 does not receive the transmitted packet back within a predetermined interval, then operation proceeds back to step 406 where node A again indicates readiness to do loopback testing. Processing then continues to step 408 where node B can loop back another available port and notify node A accordingly via the control channel.

To avoid ambiguity in interpreting received test packets, a node should conduct only one test session where it will be the node emitting test packets. It is however permissible for a node to interleave a test session where it emits test packets with a test session where it is the one looping back its ports. Also, a port that is currently looping back one of its ports for administrative reasons other than link verification should not begin a link verification session where it will be looping back ports.

As described above, the loop verification process is capable of detecting a miswiring situation where, e.g., the fiber carrying data to port 308 on node B originates with port 302 on node A but the fiber carrying data from port 308 on node B leads to port 304 on node A. The loop verification process may also be extended to detect the miswiring case where two fibers from a single port on the node that is looping back its ports during verification go to different ports on the other node. For example, the fiber carrying data from port 302 on node A may be connected to port 308 on node B while the fiber carrying data to port 302 on node A may be connected to port 306 on node B. This can be detected by having node B, after looping back the input and output of each available port, also perform cross-connections between the inputs and outputs of its available ports. The cross-connection is then identified in the TestStatusPending message so that node A can report any detected miswiring.

Figure 5:
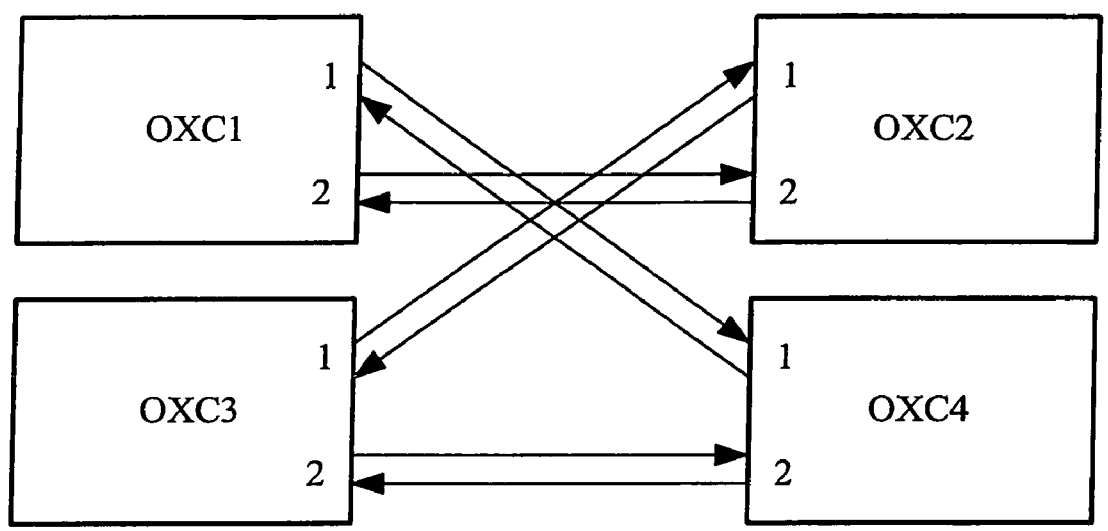
FIG. 5 depicts an interconnection of optical cross-connects helpful in describing a solution to a race condition that may arise in the course of link verification according to one embodiment of the present invention.

FIG. 5 illustrates a race condition in loop verification that may be remedied according to one embodiment of the present invention. Consider a situation where OXC1 initiates loopback verification with OXC2 at the same time that OXC3 initiates loopback verification with OXC4. During these simultaneous processes it is possible that while OXC1 is attempting, through its port 1 to discover a connection to OXC2, port 1 of OXC4 will be in a looped back state as a result of control information from OXC3. Port 1 of OXC1 will then receive its packets back as if they had been looped back by OXC2 even though they had actually been looped back by OXC4.

While this unusual condition can be rectified during later test verifications, it is avoided by extending the link verification protocol to require that OXC1 tell all its neighbors that it is connected to that it is involved in loopback link verification. For example, OXC1 broadcasts, via the control channel, a StartLoopbackLinkVerification message to its neighbors prior to link verification and then an EndLoopbackLinkVerification message once verification has ended. The verification process would preferably not start until acknowledgement of the StartLoopbackLinkVerification message is received from all neighbors. This would temporarily block those neighbors from initiating link verification.

If StartLoopbackLinkVerification messages from two nodes were to "collide", e.g., a node that has sent the StartLoopbackLinkVerification message receives another one sent by a neighbor before hearing the acknowledgement of its own, the node with the lowest IP address is selected to perform link verification. Alternatively, any suitable tie-breaking mechanism may be used here. For example, the colliding nodes will repeat the StartLoopbackLinkVerification message after a pseudorandom backoff interval.

The link verification technique disclosed herein is a highly advantageous in that minimal line termination resources are required. Of a node pair engaged in link verification, only one node needs any line verification capability at all while the other node merely loops back its ports. This capability is highly complementary to very high throughput optical network devices that are transparent to the data that they relay.

It is understood that the examples and embodiments that are described herein are for illustrative purposes only and various modifications are changes in light there of will be suggested to persons skilled in the art and are to be included within the spirit and purview of this application and scope of the appended claims and their full scope of equivalents. For example, although optical cross-connects and routers have been described as representative nodes that may implement the link verification techniques described herein, the present invention may be applied to any suitable network device including, e.g., IP switches, ATM switches, SONET TDM add/drop multiplexers, optical packets switches, optical packet routers, etc. Also, the term "port" may refer to a logical port as well as a physical port. Furthermore, although the present invention has been described with reference to an extension to LMP, LMP need not be used to implement the present invention.

The invention claimed is:

1. A method for operating a first node in a data communication network to verify connectivity to a second node in said data communication network, said method comprising:
   looping back a port of said first node by internally connecting an input of said port to an output of said port via an all-optical connection within said first node; and
   notifying said second node of a looped back condition of said port to advance a procedure that verifies connectivity between said first node and said second node by employing said looped-back condition of said port; and
   removing said looped back condition after verifying a connection between said first node and said second node.

2. The method of claim 1 wherein said looping back occurs in response to a request from said second node.

3. The method of claim 1 further comprising:
   receiving a message from said second node indicating that said second node is sending and receiving data through said looped back port thus verifying a connection between said first node and said second node.

4. The method of claim 3 wherein said message includes information identifying a port of said second node that is connected to said looped back port.

5. The method of claim 1 wherein notifying comprises sending an LMP TestStatusPending message identifying said port.

6. The method of claim 1 further comprising verifying a connection between said first node and said second node if a message is received from said second node indicating that said second node is sending and receiving data through said looped back port.

7. The method of claim 1 further comprising selecting said port of said first node, and wherein said selected port is not in use for communicating payload data when selected.

8. An apparatus for operating a first node in a data communication network to verify connectivity to a second node in said data communication network, said apparatus comprising:
   a port having an input and an output, wherein said port input and said port output comprise optical interfaces; and
   a processor that internally connects said port input and said port output via an all-optical connection within said first node without conversion to or from electrical form, that notifies said second node of a looped back condition of said port to advance a procedure that verifies connectivity between said first node and said second node by employing said looped back condition of said port, and removes said looped back condition after verifying a connection between said first node and said second node.

9. The apparatus of claim 8 wherein said processor connects said port input and said port output in response to a request from said second node.

10. The apparatus of claim 8 wherein said port input and said port output are connected without providing a termination for data relayed between said port input and said port output.

11. The apparatus of claim 8 wherein said apparatus comprises an all-optical switch matrix to which said port is coupled.

12. The apparatus of claim 8 wherein said processor receives a message from said second node indicating that said second node is sending and receiving data through said looped back port thus verifying a connection between said first node and said second node.

13. The apparatus of claim 8 wherein said processor notifies said second node by sending an LMP TestStatusPending message identifying said port.

14. An apparatus for operating a first node in a data communication network to verify connectivity to a second node in said data communication network, said apparatus comprising:
   a port having an input and an output, said input and output comprising optical interfaces;
   a line termination unit capable of, in accordance with a protocol, interpreting data received via said port input and formatting data to be transmitted via said port output; and
   a processor that connects said line termination unit to said port, monitors data received at said port at said first node to check for a match to data transmitted at said first port, and if said received data matches said transmitted data, determines that said port at said first node is connected to an internally looped-back port at said second node, stores an indication of connectivity between said first node and said second node, and removes said looped back condition after verifying a connection between said first node and said second node, said data traveling entirely in optical form between said first node and said second node and through said looped-back port.

15. The apparatus of claim 14 wherein said apparatus comprises a router for which said port is an interface.

16. The apparatus of claim 14 wherein said processor, prior to monitoring, requests said second node to perform verification; and receives a message from said second node identifying said looped-back port.

17. An apparatus for operating a first node in a data communication network to verify connectivity to a second node in said data communication network, said apparatus comprising:

means for looping back a port of said first node by internally connecting an input of said port to an output of said port via an all-optical connection within said first node; and means for notifying said second node of a looped back condition of said port to advance a procedure that verifies connectivity between said first node and said second node by employing a looped back condition of said port; and means for removing said looped back condition after verifying a connection between said first node and said second node.

18. The apparatus of claim 17 wherein said means for notifying comprises means for sending an LMP TestStatus-Pending message identifying said port.

* * * * *